E. S. HALSEY.
THERMOSTATIC HEAT REGULATING VALVE MECHANISM.
APPLICATION FILED MAR. 1, 1916.

1,285,990.

Patented Nov. 26, 1918.
3 SHEETS—SHEET 1.

Inventor
Edward S. Halsey

E. S. HALSEY.
THERMOSTATIC HEAT REGULATING VALVE MECHANISM.
APPLICATION FILED MAR. 1, 1916.

1,285,990.

Patented Nov. 26, 1918.
3 SHEETS—SHEET 3.

Inventor

Edward S. Halsey

UNITED STATES PATENT OFFICE.

EDWARD S. HALSEY, OF YONKERS, NEW YORK.

THERMOSTATIC HEAT-REGULATING VALVE MECHANISM.

1,285,990.      Specification of Letters Patent.      Patented Nov. 26, 1918.

Application filed March 1, 1916. Serial No. 81,340.

*To all whom it may concern:*

Be it known that I, EDWARD S. HALSEY, a citizen of the United States, and resident of Yonkers, in the county of Westchester and State of New York, have invented certain new and useful Improvements in Thermostatic Heat-Regulating Valve Mechanisms, set forth in the following specification and claims.

This invention relates primarily to that class of thermostatic diaphragm valves, or valve operating mechanisms in which the initial actuating pressure is conveyed directly or indirectly from a distant liquid thermostat to a hot diaphragm expansion chamber or a diaphragm within the valve by means of a small tube similar to that shown in Figure 19. of my U. S. application, Serial No. 852160, of July, 21st, 1914.

The objects of my present invention are to increase the efficiency constancy and durability of such devices and their adaptability to a wide field of application; to compound and multiply the diaphragm travel and force with a minimum expansion of a thermostatic liquid confined in a reservoir communicating with said valve mechanism and the accomplishment of the further detailed improvements set forth in the following specification and claims.

Referring to the accompanying drawings which illustrate my invention, in which similar characters or numerals refer to similar parts throughout the several views, Fig. 1. shows a vertical cross section in fraction of my compound steam valve mechanism with fraction of tube which is to connect it with the thermostatic liquid reservoir R. Fig. 8 is a side elevation of another modification of my thermostatic reservoir tube in partial cross section and Fig. 9. is a section through line 9—9 of Fig. 8. Figs. 10, 11, and 12 are each modifications or forms in which my thermostatic reservoir may be made. Fig. 13. is a section through line 13—13 of Fig. 12. Figs. 14 and 15. are respectively a side elevation and bottom end view of still another form of my thermostatic reservoir tubes which I propose using in conjunction with the afore referred to valve mechanisms, while Fig. 16. is still another form or modification of a valve actuating mechanism which may be used in conjunction with any of the thermostatic tubes referred to.

Figures 4, 17:
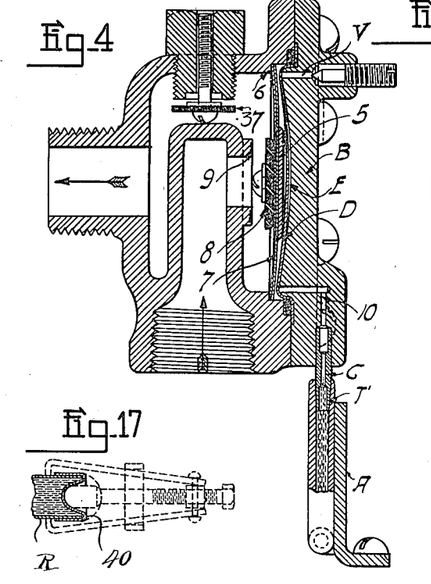
Fig. 4 is a side elevation in cross section of my simple steam radiator valve in cross section with fraction of reservoir connecting tube.
Fig. 17 is a tube end, indenting, calibrating device.
Figure 5:
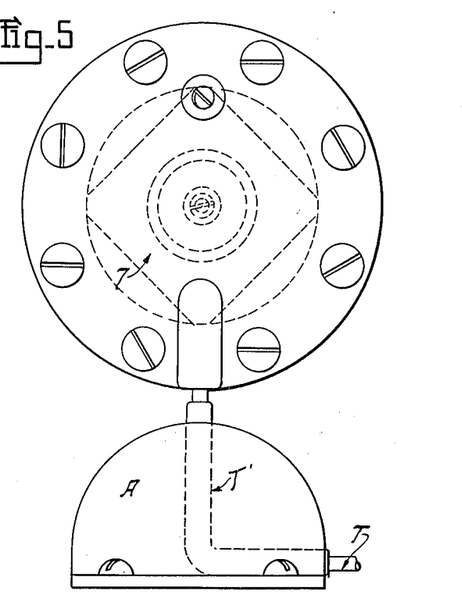
Fig. 5. is a front elevation of same.

A clear understanding of the exact action of the described mechanisms can more quickly be arrived at by referring first to the simplest form shown in Figs. 4. and 5., in conjunction with either one of the thermostatic tubes shown on the same page which are typical of the class. The valve body here shown is of a special construction I have designed for the thermostatic control of steam radiators on either high or low pressure. The steam supply coming in from the edge of the valve, which is set upright on edge, and having a concentric inlet port and seat 9, facing the valve bonnet, B, which bonnet has clamped and solder sealed to it the concave bronze diaphragm, D, thus forming an expansion pressure chamber, E, between them. Concentrically mounted between said diaphragm and opposed steam port is a valve disk, 8, of suitable composition. Said disk is spring mounted by the double spring plate, 7, which bridges the mouth of the valve, resting upon a shoulder, 6. These spring suspension plates are in the form of squares resting on their corners. Back of said plates and disk is a reinforcing disk, 5, to which the valve disk and springs are clamped by a central screw.

Figures 7, 8, 9:
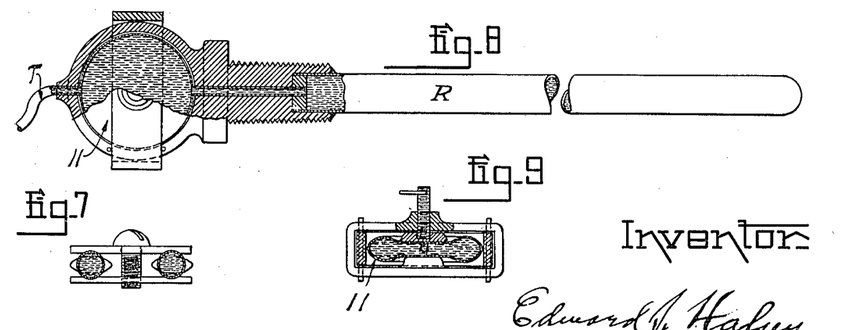

37 is a linoleum-disked free working check valve to prevent a vacuum forming on the low pressure side or in the radiator. A pressure duct, 10, leads in, to the bottom edge of the bonnet and expansion chamber from the thermostatic tube R, for which we will take that shown in Figs. 8. and 9. as an example, being connected thereto by a small metal tube, T. This thermostatic tube or reservoir, which may be constructed of any non-elastic (or non-yielding to internal pressure) form, as shown in Fig. 8, is a long cylinder filled with a highly expansive liquid such as alcohol having a small pressure duct leading out from one end through a compressible chamber, 11, to the connecting tube, T, which may be of any convenient length leading to the expansion chamber of the valve. This thermostatic tube may be set so as to work at normal temperatures for room regulation or may be screwed through the walls of a dry room, bake oven, vat or other container of which it is desired to control the temperature. Or it may be screwed into the exhaust pipe of a radiator or other steam consuming device to act to cut off the steam supply as soon as an overflow of steam starts to pass out through the exhaust. In any case however in which the temperature of the liquid in this thermostatic reservoir exceeds the temperature for which it has been calibrated, a minute quantity of liquid, preferably alcohol, is squeezed into said valve expansion chamber by the forceful expansion of the reservoir liquid; said expansion chamber always being hot from the connected steam, as is well understood, the minute quantity of volatile liquid which may be injected into said chamber, by, say one degree rise in the temperature of the liquid in the reservoir, will be immediately volatilized to the vapor form, assuming a bulk hundreds of times greater than the injected liquid and of an equal pressure therewith, thereby forcefully dilating said diaphragm against the valve disk and closing the inlet port in proportion to the amount of said injected liquid and resultant expansion.
On the other hand, upon a slight temperature fall and contraction of said liquid, a minute quantity of the hot vapor would be drawn back in the connecting tube where it would have a tendency to condense, making place for other portions of the vapor to follow with continued condensation, provided however there is provision made to keep a definite part of said tube at a definite uniform temperature sufficiently cool for the rapid condensation of said vapors. Otherwise the latent heat from the first condensation would increase and extend the temperature of said pipe to a more distant point from said chamber so that the tendency would be to automatically check and retard said condensation on account of the wandering, unstable dividing line between said condensing and vaporizing temperature points in said tube.
I have effectually overcome the possibility of this occurrence and have provided a structure having a greatly increased efficiency by establishing a sharp, definite and very short dividing zone between the hot effective volatilizing point and cold effective condensing point by a small, short capillary junction tube, C, between the hot brass body of the expansion chamber and the connecting tube, T', and making this tube immediately outside of said capillary junction of a high conducting metal, preferably copper, for rapidly dissipating the heat, which effect I preferably further accentuate by uniting to said condensing section of said tube, close to said junction, a large radiating surface of high conductive metal in any convenient form, such as A soldered to it.

While this junction tube, C, may be made of iron in conjunction with an outer tube of higher conducting metal, I prefer to construct it of some conglomerate alloy of nickel, iron and other metals to give the highest possible resistance to heat conduction and so as to allow its cross section to be of a robust thickness to eliminate liability to mechanical injury. I find the commercial product nichrome to be well adapted for this purpose. And I preferably make the bore through this junction piece as small as feasible without the liability of stoppage so that a very minute expansion or contraction of the expansive liquid is sufficient to carry a portion of the volatile fluid, either liquid or vapor, completely across the neutral zone from the hot vaporizing point to the cold condensing point. While the bore of this end or junction portion of the liquid duct which connects with the hot expansion chamber may be either of larger or smaller capillary size, I prefer it shall be of .030 to .040 of an inch in diameter.

I make my pressure connection close to the lowest point of the expansion chamber so that in case the expansion chamber contains any unvolatilized liquid at any time, said liquid will be drained therefrom, as liquid, in advance of any vapor or particles of air upon the contraction of the liquid in the thermostatic reservoir. If this connection were made at higher points said liquid could only return to the connecting tube by gradually distilling over into it resulting in a very sluggish and inefficient action of the device.

At the upper or highest point of my expansion chamber I provide a vent hole, V, closed by a pin pointed screw. Upon first filling and setting up the device I vent all air from the system as far as possible through this vent, after which it is hermetically sealed. And since it is not always possible in practice to eliminate the last remnants of air I find it advantageous to provide an air trap in the tube leading to the thermostat close below the junction capillary, C. I find a satisfactory means of doing this is to use a short section of copper tube, T', large enough to act as a sleeve to slip over my stout capillary tube and the lower end of said copper tube to slip over the connecting tube to the thermostat reservoir. This also provides a convenient and strong mechanical joint after it is soldered.

With this trap, as the vapors come down through the capillary and strike the upper cold end of the copper tube, they condense and trickle down the walls thereof, depositing any absorbed air particles in the upper part of the copper tube so that upon reversed action the first initial expansion carries them back into the expansion chamber where they will not disturb materially the calibration and operation of the device if minute in quantity.

With the type of valve shown in Figs. 4. and 5., I have successfully controlled fluctuating steam pressures up to one hundred pounds and over on steam cars and elsewhere, for which this valve is well adapted. And under average conditions I secure a temperature control within one degree of normal in thermostat temperature fluctuation.

In order to eliminate the crushing of the diaphragm from freezing of water in the valve body, as in steam car work, or from mechanical bruising from handling, also to secure an expansion chamber having no liquid or air space when collapsed, I have devised the expansion chamber shown formed of a concave diaphragm plate of proper shape to give a good working travel and a solid back plate turned out to fit it as perfectly as is practical; and as this chamber is operated with high pressure steam at temperatures approaching the weakening point of the best high temperature soft solders, I have devised means of uniting the spring tempered phosphor bronze diaphragms to the brass back plate both by a mechanical clamp and a sealing film of solder between the edge of the diaphragm and the back plate.

In Fig. 4. the edge of the diaphragm is turned back and flanged for a considerable width. Said flange being set into and soldered to the back plate. And is given adequate mechanical strength by being clamped tightly against the valve body by eight clamping screws distributed around it.

Figure 1:
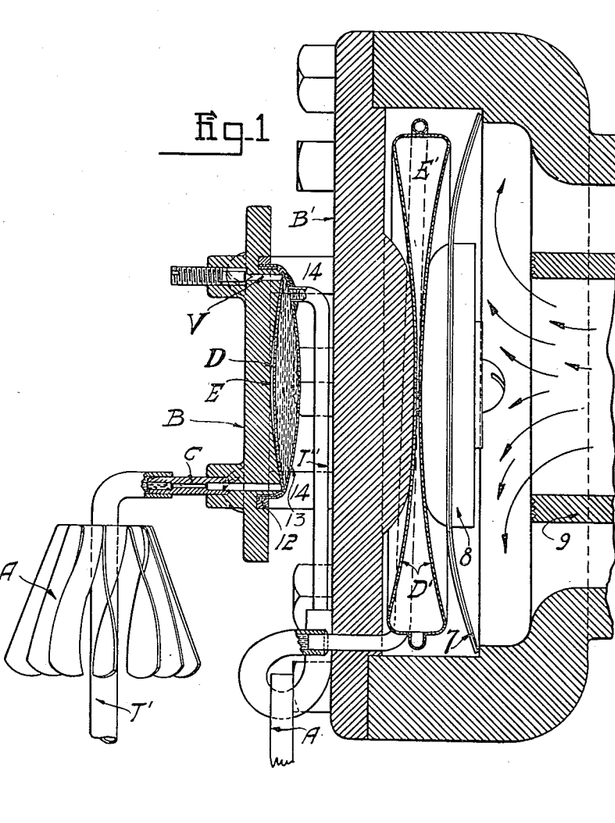

In Fig. 1. the rim of the diaphragm, D, is set into a channel turned in back plate, B, and a ring, 12, is forcefully compressed with it into said channel, making a tight mechanical joint. This figure also shows a convex metal cap 13 with fac-simile turned back edge overlying and pressed back into said groove with said diaphragm rim and ring.

In setting these diaphragms into the back plate in this way I preferably tin the diaphragm edges and ring thinly before they are pressed into position, also giving a thin filming of flux so that upon heating the united parts above the melting point of the solder a double assurance is given as to the strength and tightness of this pressure chamber.

Figure 2:
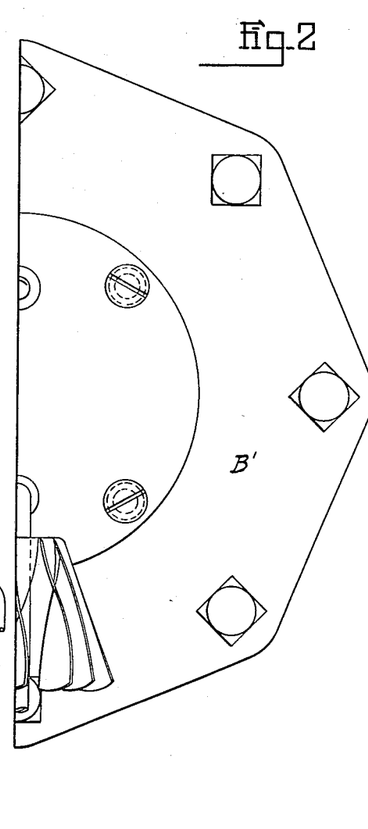
Fig. 2. is a front elevation of said valve in fraction.

The more complex construction and action of the type shown in Figs. 1. and 2. are as follows: The initial expansion chamber, E, is practically the same as the one just described with the addition of the cap, 13, referred to, over the diaphragm, creating between them a compression chamber for which said diaphragm becomes the piston. This compression chamber is filled with alcohol or other liquid and communicates through a tube, T'', into a second expansion chamber, E', on the inside of a large valve. This second expansion chamber is drained free of liquid when the primary diaphragm or piston is collapsed. But a slight initial expansion of the first diaphragm resulting from an infinitesimal expansion of the liquid in a connected reservoir, R, results in the squeezing of a multiplied quantity of alcohol by said compression chamber into the large hot expansion chamber inside of said large valve, thus compounding the action and effect of the initial expansion thousands of times, resulting in as large and powerful valve movement as may be desired by the small and simple thermostatic combination with a minimum temperature change.

The large expansion chamber, E', in order to secure a maximum lateral travel is constructed of a pair of diaphragms, D' D', united to form a double expansion. In other respects the internal construction of this large valve is equivalent to that of Figs. 4. and 5. previously described.

In this compound construction the initial expansion chamber is shown mounted to the bonnet of the large valve by a series of mounting studs, 14, screwed to said bonnet. Said initial expansion chamber, through said stud connections, acquires a temperature of fixed relation to that of the large valve, being designedly about forty degrees lower so that the alcohol in the compression chamber is always well below the boiling point.

And further, with the construction shown in these Figs. 1. and 2. I use instead of alcohol in the connecting tube, T, leading to the thermostat reservoir a filling of a volatile liquid having a lower boiling point, such as acetone so that it will volatilize and expand efficiently at the reduced temperature of said initial expansion chamber.

With reference to the class of volatile liquids which I find suitable for this work, I regard the common commercial alcohols as the most generally adaptable. Grain or denatured alcohol has the best properties for high pressure steam valve work and wood alcohol for low pressure work.

In this case where the term alcohol is used, the common commercial alcohols referred to or their intermixture is meant. I have found by exhaustive experimentations that liquids which have a normal boiling point below 110 degrees F. are not suitable for use with ordinary steam valve work as the volatilizing liquid for the expansion chamber on account of excessive pressure and their sluggishness in condensing and I prefer to use liquids having a boiling point 35 or 40 degrees below the temperature of the expansion chamber which gives sufficient working pressure without danger of overstraining the diaphragm. In all cases where the temperature to be regulated is above the boiling point of water I use an expansive liquid in my thermostat reservoir having a boiling point of a temperature considerably above 212°, and by this means may regulate temperatures as high as 350 degrees by selecting suitable expansive filling for the reservoir. In such cases I separate and insulate the volatile liquid for the expansion chamber and connecting tube from the high temperature reservoir and liquid by means of the arrangement shown by Fig. 12., in which there is inserted a separate diaphragm pressure exchanging chamber, 15, in the pressure communicating tube leading from the thermostat reservoir to the valve. In this intermediate chamber is an inner flattened tube, 16, sealed at the lower end and communicating by a tube from its upper end to the expansive pressure from said thermostat. The intervening tube also acts to thermally insulate said transfer chamber and its volatile liquid from the high temperature. As the shell of this transfer chamber is completely filled with the volatile liquid which communicates through the tube T from its lower end with the valve expansion chamber E, any expansion or contraction of the thermostat liquid will be transferred to the volatile liquid surrounding the flattened tube, 16, by its dilation or collapse, and to said valve.

Figure 11:
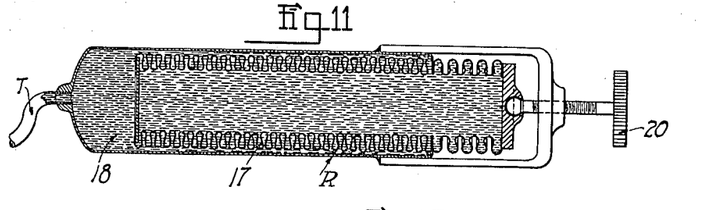

For low temperature work an expansive thermostatic liquid having a lower boiling point than alcohol may be advantageously used in the type of thermostatic reservoir shown by Fig. 11. By this device ether or combinations therewith giving a higher and more accelerated expansion at the mean working temperature desired may be utilized to advantage on account of having a more rapid expansion than alcohol at these temperatures.

Figure 10:
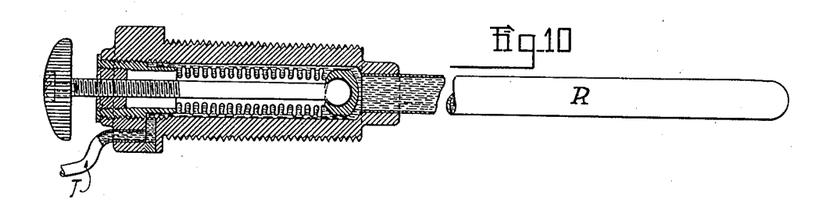

By utilizing this diaphragm partitioned thermostatic reservoir and charging the inner accordion cylinder, 17, with the highly expansive mixture selected, its movements are directly transferred to the alcohol filling in the surrounding space, 18, which communicates by the connecting tube to the valve. An adjusting screw, 20, is provided for an outer section of the elastic bellows for making temperature adjustments. A similar means of adjustment is provided for the thermostat shown by Fig. 10, in which the metallic adjusting bellows is expanded and contracted altering its liquid displacement by a similar ball socketed thumb screw.

Figure 3:
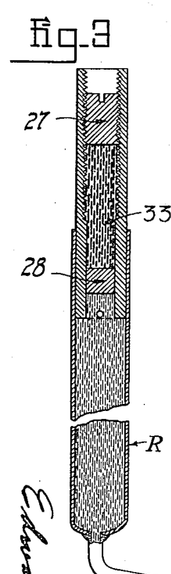
Fig. 3. is a side elevation of a thermostatic liquid reservoir tube. R. in fraction.
Figures 12, 13, 14, 15, 16:
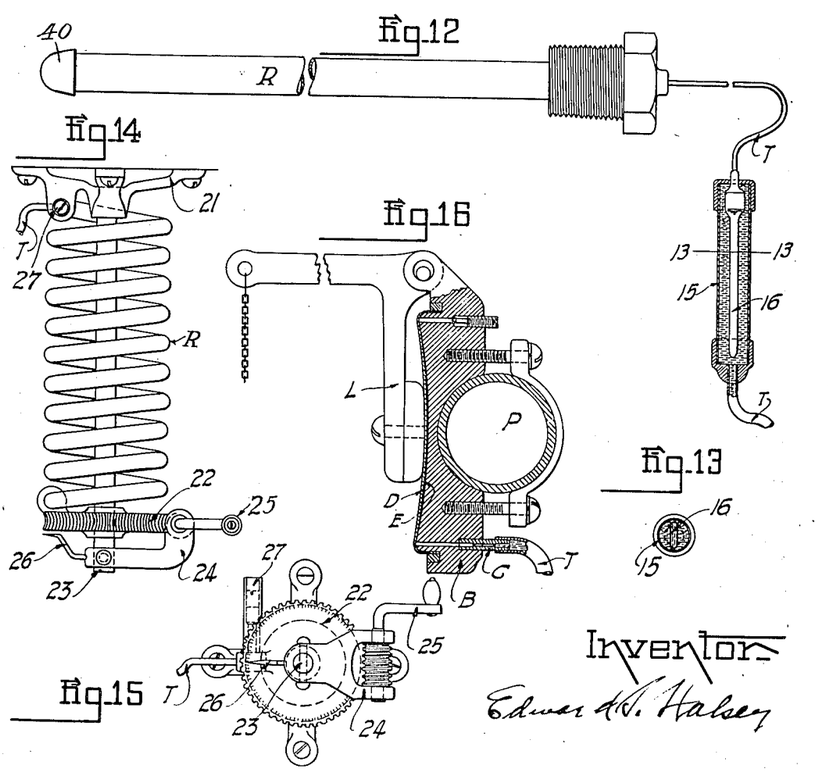

In Fig. 14. I show a thermostatic reservoir constituted by a long vertical helical coil of pipe, or multiple turn Bourdon tube. The upper end of this tube is sweat into a crow-foot ceiling bracket, 21, and the bottom end of the tube is sweat into a lug of a worm wheel, 22, which revolves on a vertical spindle, 23, hanging from said bracket. Pinned rigidly to the bottom end of this vertical rod is a worm supporting bracket, 24, which carries a coarse worm gear in mesh with said worm wheel which may be revolved in either direction by the crank, 25. By this means said worm wheel and attached tube end may be rotated or warped one revolution. Opposite said worm gear is mounted a pointer, 26, and on the bottom face of said worm wheel is a temperature scale which may be divided into a range of ten or twelve degrees, so that after the device has once been calibrated, say at 72 degrees, by means of the adjusting screw or plug, 27, which acts to stop the upper end of said tube, any temperature down to say, 60 degrees, may be secured by simply turning the crank until said pointer rests over the point on said scale indicating said temperature. This adjusting calibrating plug, 27, and its application is shown in an enlarged cross-section as applied to the straight thermostat reservoir in Fig. 3. Said plug travels back and forth in a close fitting thread in the end of the tube being heavily luted with a thick viscous mixture, 33, such as a viscous oil, charged with a fine earthy pigment which is not affected by the liquid contents of the tube. A quantity of this mixture is introduced in the tube ahead of this plug and a secondary plug, 28, may be set in loosely ahead of the luting to prevent it from settling.

The crowned metal calibrating cap, 40, shown closing the end of thermostat tube, R, in Figs. 17 and 12, preferably consists of a soft drawn metal shell soldered over the end of the tube, and is used to secure the final permanent calibration of the device by indenting the cap the required amount after filling and bleeding down the thermostatic tube to the approximate adjustment. This indentation may be done by striking with a pointed instrument but can be more satisfactorily done by a detachable claw screw, as indicated by dotted lines in Fig. 17, similar to a shaft pulley.

Figure 6:
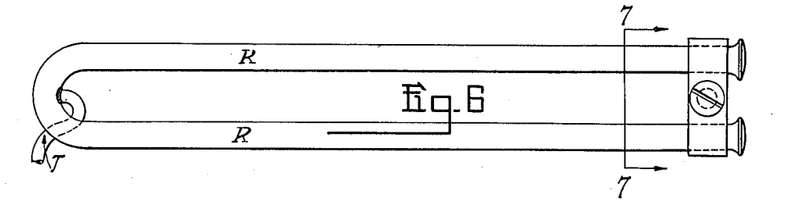
Fig. 6. is another form of the thermostatic reservoir tube which I have devised and Fig. 7. is a cross section therethrough on line 7—7.

I sometimes use the form of adjustment shown in Figs. 6. and 7. on the U tube thermostat there shown. This adjustment simply consists of a pair of clamping bars astride of the two ends of the tube clamped toward each other by a center screw. The two ends of the tube are here shown to be sealed by pinching flat together and soldering; and the clamping or flattening effect of this adjustment is applied at the point where the flattened ends of the tube shade off into the round shape.

Fig. 16. illustrates a still more indirect valve actuating mechanism thermostatically controlled which is suitable for operating fuel gas on steam boilers or hot water or tank heaters. Also it may be used for controlling the fire under a steam boiler by regulating the drafts thereof through a butterfly or other suitable flue valves. Examination will show that the back plate, B, of the diaphragm expansion chamber, E, is saddled and clamped in intimate thermal contact with the live steam pipe, P. Said expansion chamber is provided with the same connecting tube, T, to any suitable thermostatic reservoir and its expansion and operation is identical with the simple forms previously described except that instead of expansion chamber pushing directly against the valve port disk, it presses directly against the short padded arm of an L lever which is pivoted to the upper edge of the said back plate casting from which pivot extends a long horizontal arm of said lever multiplying said diaphragm travel and carrying at its outer extremity, shown by a fractional section, a pendant chain from an eyelet, which chain may be conveniently connected with the heat dominating valve controlling the temperature of the apparatus with which it is connected and intended to regulate.

By placing my diaphragm expansion chamber on the low pressure side of the valve port I secure material advantage in the efficient operation of the valve, especially in closing off tight against high pressures.

By the use of tubular thermostatic reservoirs, R, similar to those shown in Figs. 8. and 10., in connection with a valve similar to that shown in Figs. 4. and 5., it is obvious that I secure a very efficient means of controlling the steam supply for a tank heater or similar work, with which no external energy such as air or water pressure is required to operate it.

I have found that tetrachlorid of carbon, or chloroform, with preference for the former, may be used for this work and have the advantage of being fire-proof. But on account of the great specific gravity and vapor tension, I presume, when the thermostatic tube is much elevated above the valve the liquid column breaks, apparently filling the break with vapors which are very slow in being re-absorbed after turning on the steam, thus holding the valve closed for a long period. I am aware that expansive liquid thermostats have been suggested or used for operating a distant thermostatic valve with which they communicate through a small tube, in some respects similar to those hereinbefore described; also that the generic principle of actuating a heating valve by the automatic injection and withdrawal of a small quantity of volatile liquid into and from a normally dry, hot expansion chamber is not broadly new, and I do not claim the same broadly.

What I do claim is:—

1. In a device of the character described comprising a vaporizing expansion chamber, said chamber including a solid fixed vertical plate constituting the base of said chamber and a diaphragm member having air tight connection at its outer edge with said plate, said diaphragm member being adapted to expand or contract in directions away from and toward said plate; a liquid filled reservoir for causing the movements of said diaphragm by the injection and withdrawal of its vaporizable and condensable fluid into and from the said expansion chamber; a duct for conveying said fluid from said reservoir, said duct leading through the bottom edge of said fixed plate so as to directly drain any unvaporized fluid from the bottom of said chamber upon the contraction of the fluid in said reservoir; and a sealable hole through the top portion of said plate for the purpose specified.

2. In a device of the class described a thermostatic liquid filled reservoir; a temperature regulating valve; a normally dry, hot vaporizing diaphragm expansion chamber geared to and actuating said valve; a liquid filled, pressure communicating, constantly cooled condensing tube from said reservoir connecting close to the lowest point of said diaphragm chamber adapted to withdraw from the latter any unvaporized liquid therefrom in advance of withdrawn vapor condensing in the neck of said tube when the volume of said reservoir liquid falls to or below its normal working degree of expansion, for which said mechanism may be adjusted.

3. In a device of the class described a thermostatic liquid filled reservoir; a heat dominating valve; a hot, normally dry expansion chamber in working engagement with said valve; a liquid and heat conducting tube between said reservoir and said hot chamber; and a suitable heat insulating connection between said tube and said hot chamber.

4. In a device of the class described a thermostatic liquid filled reservoir; a heat dominating valve; a normally dry hot vaporizing diaphragm expansion chamber in working engagement with said valve; a connecting tube between said reservoir and said hot chamber; and a short capillary junction tube of relatively low heat conducting metal, as compared to the metal of the first said tube, joining the first said tube to said hot chamber.

5. In a device of the class described a thermostatic liquid filled reservoir; a temperature regulating valve; a hot, normally dry vaporizing expansion chamber in working engagement with said valve; a connecting tube between said reservoir and said hot chamber cooled to a practically constant condensing temperature, at a fixed point close to said chamber; said connecting tube running from said hot chamber in a downward direction for some distance below the thermally neutral point of the condensing portion of said tube for the purpose specified.

6. In a device of the class described a thermostatic liquid filled reservoir; a heat dominating valve; a hot, normally dry expansion chamber in working engagement with said valve; a connecting tube between said reservoir and said hot chamber; a short, capillary junction tube leading out from said chamber; and a tubular sleeve slipped over and soldered to the outer end of said capillary tube and the other end of said sleeve connected with said connecting tube for the purpose specified.

7. In a device of the class described a thermostatic liquid filled reservoir; a heat dominating valve; a hot and normally dry diaphragm expansion chamber in working engagement with said valve; a heat and liquid conducting tube between said reservoir and said hot chamber; and a short heat insulating tube of a notably bad heat conducting metal alloy between said tube and said hot chamber.

8. In a device of the class described a thermostatic liquid filled reservoir; a heat dominating valve; a hot, normally dry diaphragm expansion chamber in working engagement with said valve; a connecting tube between said reservoir and said hot chamber; a short heat insulating junction tube entering said hot chamber; and a cuprous metal condensing tube joined to the outer end of said junction tube and constituting at least a portion of said connecting tube.

9. In a device of the class described a thermostatic liquid filled reservoir; a heat dominating valve; a hot and normally dry diaphragm expansion chamber in working engagement with said valve; a connecting tube between said reservoir and said expansion chamber; and a heat dissipator of suitable heat conducting material, said dissipator providing a relatively large surface contacting the air or other cooling agent, and said dissipator being in thermal contact with said connecting tube a short distance from its connection to said chamber.

10. In a device of the class described having a valve actuated by a normally dry, hot, vaporizing expansion chamber, a solid fixed vertical plate, B, constituting the base of said expansion chamber; a circular diaphragm member of said chamber soldered to said base and expanding in a plane parallel with it; a liquid filled reservoir actuating the movements of said diaphragm by the injection and withdrawal of its vaporizing and condensing fluid; and a duct for said fluid from said reservoir leading through the bottom edge of said base so as to directly drain any unvaporized fluid from the curved bottom extremity of said chamber upon retraction of said reservoir liquid.

11. In a device of the class described having a valve actuated by a normally dry, hot vaporizing expansion chamber, a solid, fixed, vertical plate, B, constituting the base of said expansion chamber; a circular diaphragm, D, sealed to said base forming an inner wall of said chamber; a liquid filled reservoir actuating the expansive movements of said chamber by the injection and withdrawal of its vaporizing and condensing fluid therefrom; a duct for said fluid from said reservoir leading through the bottom edge of said solid base so as to directly drain any unvaporized fluid from the curved bottom extremity of said chamber upon the retraction of said reservoir liquid; and a sealable hole, V, through the top edge of said solid base leading to and directly venting the uppermost part of said chamber.

12. In a device of the class described a thermostatic liquid filled reservoir; a heat dominating valve; a normally dry hot high pressure vaporizing expansion chamber actuating said valve by its movements; a liquid filled tube leading from said reservoir into said chamber; a plain, smooth normally concave disk diaphragm, D, with a back turned rim, formed with gradual curves and rounding corners of spring sheet metal substantially as shown, and being the movable wall of said chamber; a heavy solid metal flanged back-plate, B, for said diaphragm chamber; a concentric concaved raised portion to said plate formed with gradual curves and rounding corners in close fac-simile counterpart to the form of said opposing diaphragm into which it is closely fitted, and sweated within its overhanging rim substantially as shown for the purpose specified.

13. In a device of the class described a non-yielding thermostatic liquid filled reservoir; a steam radiator angle valve body having a vertical seat and bonnet; an expansion chamber formed on the inside of said bonnet by a flexible diaphragm having its edge united and sealed to said bonnet; an incoming steam port concentrically facing and opposed to said diaphragm; a port closing disk worked to and from said port against said incoming steam by the expansion of said diaphragm; a radiator delivery port from said valve back and concentric with said supply port; and a pressure duct between said reservoir and said expansion chamber.

14. In a thermostatic valve having a relatively wide bell mouth a steam tight cover therefor; a relatively small steam port seat concentrically facing the inside of said cover a short distance from it; an exhaust port from said valve; a vapor pressure actuated diaphragm expansion chamber flat to and inside of said cover expanding toward said port seat; a valve disk interposed between said seat and expansion chamber supported independent of either of them; a loose manifoldly supported leveling plate, 7, bridging said bell mouth and carrying said port closing disk fixed to its center; and a circular supporting shoulder, 6, formed within said bell mouth by reduction of its diameter for the engagement of the outer manifold extremities of said plate.

15. In a device of the class described a fluid actuated heat dominating valve; a fluid pressure expanded chamber geared to and actuating said valve by pressure changes within said chamber, a duct for said fluid with one end leading to said chamber; a thermostatic tubular reservoir filled with highly expansive liquid connecting with the other end of said duct; a calibrating means for setting the initial working temperature of the thermostat or liquid exuded from said reservoir, determining the working temperature thereof consisting of an indentable soft metal cap sealing one end of said tubular reservoir.

16. In a device of the class described a normally dry, hot vaporizing, diaphragm expansion chamber actuating a steam throttling valve by the alternate automatic injection into and withdrawal of a minute quantity of a volatilizing and re-condensing liquid to and from said hot expansion chamber; a small condenser pressure duct feeding into said hot chamber; a suitable volatile injection liquid having a normal boiling point appreciably less than that of water but not less than 130 degrees, F., filling said duct close up to said hot chamber; and a suitable thermostatic means for actuating injective and retractive movements of said liquid through said duct.

17. In a device of the class described a normally dry hot vaporizing diaphragm expansion chamber actuating a heat dominating valve by the alternate automatic injection and withdrawal of a minute quantity of a volatilizing fluid into and from said hot chamber; a duct for said fluid with one end connecting to said chamber; a hot thermostatic liquid pressure reservoir; a volatile fluid in said duct having a boiling point less than that of water but not less than 112° F.; a charge of expansive liquid in said reservoir having a boiling point appreciably higher than that of said duct liquid; an intermediate pressure transfer chamber, 15; a heat insulating pressure connection from the latter to said hot liquid pressure; and a movable diaphragm in said transfer chamber partitioning one of said liquids from the other for the purpose specified.

18. In a device of the class described a hot normally dry diaphragm expansion chamber actuating a heat dominating valve by the alternate automatic injection and withdrawal of a minute quantity of a volatilizing fluid to and from said chamber; a duct for said fluid with one end connected to said chamber and the other to a thermostatic reservoir; an expansive liquid filling said reservoir; a capillary tube constituting the junction of said duct to said hot chamber; and a suitable air trap formed in said duct close to said junction to arrest and return any air or gas particles that may be present to said expansion chamber.

19. In a device of the class described a hot normally dry diaphragm expansion chamber actuating a heat dominating valve by the alternate automatic injection and withdrawal of a minute quantity of a volatilizing fluid to and from said chamber; a duct for said fluid with one end connected to said chamber and the other to a thermostatic reservoir; an expansive liquid filling said reservoir and duct; and a capillary section of said duct having a bore not over 1½ millimeters in diameter constituting the junction portion of said duct to said hot chamber, for the purpose specified.

20. In a device of the class described a steam tight valve body; a solid metal flanged bonnet for said body; an internal hot pressure expansion chamber integral with said bonnet; an internally projecting raised portion from said bonnet consisting of a solid metal back of said expansion chamber; a thin spring metal disk diaphragm formed from a single sheet with a deep back turned edge; and a high temperature, high pressure resisting sealed joint, between said diaphragm and solid back constituted by means of the thin spring back turned metal edge of said diaphragm fitting back snugly over and sweated to the enveloped vertically inclined edge of said raised back plate; and an external actuating pressure duct piercing said bonnet and leading into said chamber for the purpose specified.

21. In a device of the character described the combination of a thermostatic liquid filled reservoir; a heat controlling valve; a hot vaporizing expansion chamber operatively related to the said valve and effecting the operation of the same; a tube for conveying liquid from the said reservoir to the said chamber, and said tube comprising a section adjacent to the said chamber consisting of suitable heat resistance material of lower heat conducting properties than iron for the purpose specified.

22. In a device of the character described the combination of a thermostatic liquid filled reservoir; a heat controlling valve; a hot vaporizing expansion chamber operatively related to said valve and effecting the operation of same; a tube for conveying liquid from said reservoir to said chamber, said tube leading to a point close to the bottom of said chamber for the purpose specified.

23. In a device of the character described the combination of a reservoir containing a readily expansible liquid such as alcohol; a valve body including a steam chamber; a hot vaporizing chamber within said steam chamber inclosed by walls one of which is in the form of a flexible member; a conduit connected with the said reservoir at one end, and its opposite end connecting with the said vaporizing chamber and terminating at a point near the bottom thereof; said tube comprising a section consisting of relatively low heat conducting material; a valve situated in said steam chamber in operative relation to the said flexible diaphragm and adapted to be actuated by the expansion and contraction of the latter for opening and closing a port substantially as described.

24. In a device of the character described a thermostatic liquid filled reservoir; a temperature regulating valve; a normally dry hot vaporizing expansion chamber; an elastic inclosing diaphragm to said chamber expanded by the vapor pressure generated therein geared to and actuating said valve; a constantly cooled liquid filled pressure communicating condensing tube leading from said reservoir and being connected with and terminating near the lowest point of said expansion chamber, said tube being adapted to withdraw from the said chamber any unvaporized liquid which may be present therein in advance of vapor which is withdrawn when the volume of said reservoir liquid retracts to or below its normal working degree of expansion for which said mechanism may be adjusted, the said vapor condensing in the cooled neck of said tube.

25. In a device of the character described the combination of a thermostatic liquid filled reservoir; a heat controlling valve; a hot vaporizing expansion chamber operatively related to said valve and effecting the operation of same; a tube for conveying liquid from said reservoir to said chamber, said tube comprising a section adjacent to said chamber of a restricted capillary bore for the purpose specified.

26. In a device of the character described a thermostatic liquid filled reservoir; a heat controlling valve; a hot and normally dry diaphragm expansion chamber for controlling said valve; a conduit extending between the said reservoir and the said expansion chamber and communicating with each of them, said conduit including a section of tube situated adjacent to the said expansion chamber and having a capillary opening therethrough and the said section consisting of a suitable material offering relatively high resistance to the passage of heat therethrough.

27. In a device of the character described the combination of a reservoir containing a vaporizable liquid such as alcohol; an expansion chamber; a heat controlling valve adapted to be actuated by the said expansion chamber, a conduit leading from the said reservoir to the said expansion chamber for conveying the said liquid to and from said chamber; and means having thermal contact with the said conduit adjacent to the said expansion chamber for dissipating heat from said conduit for the purpose specified.

28. In a device of the character described a non-yielding thermostatic liquid filled reservoir; a steam valve body having a seat surrounding a port opening into the chamber of said valve and the said valve body also having a bonnet in opposing relation to said seat; an expansion chamber formed on the inside of said bonnet by a flexible diaphragm having a flanged edge hermetically connected with the said bonnet; a port closing disk interposed between the said diaphragm and the said seat, said disk being actuated by the expansion of said diaphragm in opposition to the pressure of steam as it is delivered through the said port, and the said valve body being provided with a delivery port situated in opposing relation to the said diaphragm and concentric with the port through which the said steam is delivered; and a conduit between the said reservoir and the said expansion chamber.

29. In a temperature regulating steam valve actuated by a distant thermostat injecting small volatile liquid portions thereinto, the combination of a valve body; a solid heavy metal flanged bonnet therefor; a circular raised concave portion of said bonnet fitting and projecting well into the mouth of said body; a high pressure expansion chamber formed inside of said bonnet integral therewith, its concave projected portion creating a solid outer wall therefor; a plain concave disk diaphragm with back turned rim of thin spring metal forming the flexible wall of said chamber, having its rim tightly fitted and sweated back over said projected portion; a suitable means of rigidly clamping the edge extremity of said rim to said bonnet; and a small liquid conduit from said thermostat united with and piercing said solid bonnet into said chamber all for the purpose specified.

30. In a device of the character described comprising a valve, a normally dry, hot vaporizing expansion chamber, said chamber including a fixed wall and a flexible diaphragm having air tight connection with said wall being adapted to expand and contract away from and toward said wall, such expansion and contraction actuating said valve; a reservoir filled with a vaporizable and condensable fluid, portions of which are adapted to be injected into said expansion chamber, the vaporization and condensation of said portions of said fluid causing expanding and contracting movements of said diaphragm; and a duct connecting the said reservoir with the said chamber, said duct communicating with the bottom of said chamber whereby any unvaporized fluid within said chamber may be drained directly therefrom.

Having described my invention I hereunto set my hand in the presence of two witnesses.

EDWARD S. HALSEY.

Witnesses:
 JOHN H. GLANCY,
 S. C. HALSEY.